(12) United States Patent
Schmidt (10) Patent No.: US 12,372,302 B2
(45) Date of Patent: Jul. 29, 2025

(54) METHOD AND SYSTEM FOR RECYCLING WASTE MINERALS

(71) Applicant: TRINITY SYNERGIES A/S, Middelfart (DK)

(72) Inventor: Jesper Schmidt, Middelfart (DK)

(73) Assignee: TRINITY SYNERGIES A/S, Middelfart (DK)

( * ) Notice: Subject to any disclaimer, the term of this patent is extended or adjusted under 35 U.S.C. 154(b) by 0 days.

(21) Appl. No.: 18/838,141

(22) PCT Filed: Feb. 10, 2023

(86) PCT No.: PCT/EP2023/053319
§ 371 (c)(1),
(2) Date: Aug. 13, 2024

(87) PCT Pub. No.: WO2023/152300
PCT Pub. Date: Aug. 17, 2023

(65) Prior Publication Data
US 2025/0116461 A1    Apr. 10, 2025

(30) Foreign Application Priority Data

Feb. 14, 2022 (EP) .................................. 22156565

(51) Int. Cl.
*F27B 7/34* (2006.01)
*B01D 53/14* (2006.01)
(Continued)

(52) U.S. Cl.
CPC ............ *F27B 7/34* (2013.01); *B01D 53/1456* (2013.01); *B01D 53/1493* (2013.01);
(Continued)

(58) Field of Classification Search
None
See application file for complete search history.

(56) References Cited

U.S. PATENT DOCUMENTS 3,615,783 A  10/1971  Howard
4,662,941 A   5/1987  Hagerman
(Continued)

FOREIGN PATENT DOCUMENTS

EP  2072474 A1  6/2009

OTHER PUBLICATIONS

European Patent Office, Extended European Search Report issued in corresponding EP appl. No. 22156565.8 dated Jul. 20, 2022, 6 pages.

(Continued)

*Primary Examiner* — Michael Forrest
(74) *Attorney, Agent, or Firm* — J. Peter Paredes; Amin Wasserman Gurnani LLP (57) ABSTRACT

The invention relates to a method and a system for obtaining a recyclable product from waste minerals by heating the mineral waste in a combustor by combusting waste fuel in a closed loop combustion process and treating the mineral waste with high levels of oxygen and/or carbon dioxide. A mixture of waste minerals for recycling and waste fuel for combustion is supplied to a combustor, also concentrated oxygen and recycled flue gas comprising carbon dioxide is supplied to the combustor for heating the mineral waste in an atmosphere of increased oxygen and carbon dioxide level to obtain a recyclable product from the waste minerals.

17 Claims, 5 Drawing Sheets

(51) Int. Cl.
  *B01D 53/56* (2006.01)
  *B01D 53/78* (2006.01)
  *C04B 7/36* (2006.01)
  *C04B 7/38* (2006.01)
  *C04B 7/44* (2006.01)
  *C04B 7/47* (2006.01)
  *F23C 9/08* (2006.01)
  *F23L 7/00* (2006.01)
  *F23N 1/02* (2006.01)
  *F27B 7/42* (2006.01)

(52) U.S. Cl.
  CPC ............. *B01D 53/56* (2013.01); *B01D 53/78* (2013.01); *C04B 7/367* (2013.01); *C04B 7/38* (2013.01); *C04B 7/4415* (2013.01); *C04B 7/4423* (2013.01); *C04B 7/4476* (2013.01); *C04B 7/47* (2013.01); *F23C 9/08* (2013.01); *F23L 7/007* (2013.01); *F23N 1/022* (2013.01); *F27B 7/42* (2013.01); *B01D 2251/304* (2013.01); *B01D 2251/306* (2013.01); *B01D 2251/604* (2013.01); *B01D 2252/103* (2013.01); *B01D 2257/404* (2013.01); *B01D 2258/0291* (2013.01); *F23N 2225/08* (2020.01)

(56) References Cited

U.S. PATENT DOCUMENTS

| | | |
|---|---|---|
| 5,309,850 A | 5/1994 | Downs et al. |
| 5,709,728 A * | 1/1998 | Fleckenstein ............. C03B 3/00 65/540 |
| 6,119,606 A | 9/2000 | Clark |
| 6,216,611 B1 | 4/2001 | Baudhuin |
| 2014/0311184 A1* | 10/2014 | Hansen ................... C03B 3/026 65/28 |
| 2019/0024583 A1 | 1/2019 | Lu et al. |

OTHER PUBLICATIONS

WIPO/ISA/EPO, International Search Report and Written Opinion for corresponding application PCT/EP2023/053319 dated Apr. 12, 2023, 11 pages.

Bensakhria, A., et al., "Natural gas oxy-combustion with flue gas recycling for CO2 capture." Chemical Engineering 21 (2010): 637-642.

Moreno-Juez, J., et al. "Treatment of end-of-life concrete in an innovative heating-air classification system for circular cement-based products." Journal of Cleaner Production 263 (2020): 121515, 15 pages.

Yap, Z. S., et al. "Waste mineral wool and its opportunities—a review." Materials 14.19 (2021): 5777, 16 pages.

Ramírez, C. P., et al. "Feasibility of the use of mineral wool fibres recovered from CDW for the reinforcement of conglomerates by study of their porosity." Construction and building materials 191 (2018): 460-468.

Zeman, F. "Oxygen combustion in cement production." Energy Procedia 1.1 (2009): 187-194.

\* cited by examiner

Fig. 5

METHOD AND SYSTEM FOR RECYCLING WASTE MINERALS

CROSS-REFERENCE TO RELATED APPLICATIONS

The present application claims priority to PCT application serial no. PCT/EP2023/053319, filed Feb. 10, 2023, which claims priority to European patent application serial no. 22156565.8, filed Feb. 14, 2022, each herein incorporated by reference in their entireties.

FIELD OF THE INVENTION

The present invention relates to a method and a system for obtaining a recyclable product from waste minerals by heating the waste minerals in a combustor by combusting waste fuel in a closed loop combustion process and treating the waste minerals with oxygen and carbon dioxide.

BACKGROUND OF THE INVENTION

Disposal of waste is an increasing problem. One method of disposal of waste is combusting the waste. Combusting waste, such as garbage, is well known for utilizing the energy content for producing electrical energy and/or heat. However, it is desirable to recycle and reuse materials by extracting recyclable materials or minerals from the waste material.

It is known to burn waste in a combustor and to produce exhaust gases, leaving ash and incombustible materials as residuals. For instance when combusting building waste, which may be a mixture of different materials like cement, concrete, fibre cement, wood, metal etc., in a combustor, leads to a mixture of, among other things, cement and metal as residuals.

However, the residuals may be used for different purposes, for instance the cement may be crushed and mixed into new cement. However, the old crushed cement is of low quality that only makes possible to use it in a limited amount in the mixture with new cement, and it may reduce the quality of the cement, which therefore only can be used for purposes that not require too high quality.

Hence, an improved method and system for treating and recovering recyclable minerals from waste material would be advantageous, and in particular, a more efficient and/or reliable method and system for obtaining recyclable products of higher quality from recyclable material would be advantageous.

OBJECT OF THE INVENTION

It is an object of the invention to provide a method and a system for treating waste minerals to obtain a recyclable product from the waste minerals by heating the waste minerals in a combustor and treat the waste minerals with high levels of oxygen and/or carbon dioxide.

In particular, it may be seen as an object of the present invention to provide an improved method and system for treating waste minerals that solves the above mentioned problems of the prior art and obtains a recyclable product of higher quality.

It is a further object of the present invention to provide an alternative to the prior art.

SUMMARY OF THE INVENTION

Thus, the above described object and several other objects are intended to be obtained in a first aspect of the invention by providing a method for obtaining a recyclable product from waste minerals by heating a combustor by combusting waste fuel in the combustor; the method is comprising the steps:
- supplying waste minerals and waste fuel to the combustor,
- supplying oxygen to the combustor to obtain a preselected oxygen level,
- removing flue gas comprising carbon dioxide from the combustor for recycling,
- supplying recycled flue gas comprising carbon dioxide to the combustor,
- controlling the combustion temperature in the combustor to obtain the preselected process temperature by combusting waste fuel, and by controlling the amount of waste fuel and flue gas supplied to the combustor to obtain the preselected process temperature,
- removing residual material from the combustor, the residual material is the material remaining after combusting the waste minerals and the waste fuel, and
- recovering the recyclable product from the residual material.

The invention is particularly, but not exclusively, advantageous for obtaining a recyclable product from waste minerals by treating waste minerals by heating the waste minerals to a preselected process temperature at a preselected level of oxygen with supply of flue gas comprising carbon dioxide.

The method is supplying waste minerals and waste fuel to a combustor, wherein a combustion process is performed. The waste minerals are materials that can be recycled, waste minerals comprises some kind of minerals, like mineral wool, cementitious minerals or others, which can be recovered and treated. The waste minerals are thermal treated by being heated from the combustion process by burning waste fuel. The heating may remove water and carbon dioxide from the waste minerals and the heating may burn and evaporate organic material in the waste minerals. Concentrated oxygen is supplied to the combustor to obtain a preselected oxygen level. The oxygen may oxidize the waste minerals, which may increase the melting temperature for the waste minerals, allowing treating the waste minerals at higher temperatures in solid state. Flue gas comprising carbon dioxide is supplied to the combustor. The flue gas contributes to adjusting the oxygen level in the combustor to reach the preselected oxygen level. By supplying flue gas, the oxygen level is reduced. The carbon dioxide may support the waste minerals to absorb carbon dioxide by carbonatation depending on the process temperature.

The preselected oxygen level depends on a preselected process temperature and on oxidation requirements for obtaining the recyclable product. Therefore, the oxygen level is chosen depending on the recyclable product to be obtained and the waste minerals to be processed. The preselected oxygen level in some cases is higher than 15%, but may be even higher in some cases and lower in some cases. If the waste mineral is a cementitious material, the oxygen level may preferably be 5-8%, but also in this case higher oxygen levels may be preferable in some cases. At an oxygen level at 5-8%, the combustion of the waste fuel is slower than at a higher oxygen level.

For instance, the waste minerals may be mineral wool, which, at temperatures above 600° C. and oxygen levels higher than 15%, oxygenate and form silicate complexes that show activated pozzolanic effects. Normally heating mineral wool to temperatures above 600° C. under normal combustion conditions would lead to reduced oxygen content due to the combustion of organic content using oxygen in order to elevate the temperature, and at reduced oxygen levels, glass wool mineral will melt at temperatures close to 650° C. and stone wool at around 900° C. However, at raised oxygen levels the formation of oxygenated minerals will prevent the melting of the minerals and thus making processing in solid phase possible. The recyclable product in this case will be a silicate with different properties depending on the mix of glass wool, stone wool and other mineral waste streams added to adjust the composition, and thus the quality and properties, of the recyclable product.

In another embodiment, the waste minerals may be fibre cement and/or other cementitious materials, which when thermally processed at temperatures above 600° C. become reactivated by dehydrogenation. The process performs the reactivation and/or cooling under process condition with elevated carbon dioxide levels, preferable above 20% volume, compared to normal thermal reactivation. This may lead to carbonatation of the reactivated CaO-complexes in the cementitious materials leading to the formation of carbonates and thus capture of carbon dioxide in the minerals. The oxygen level may preferably be 5-8%, but other oxygen levels may also be used, oxygen levels up to 25% oxygen may be used. The recyclable product in this case will be carbonated reactivated cementitious material.

Carbonatation is a process that occurs in cementitious materials where lime (CaO, or $Ca(OH)_2$) in the cement reacts with carbon dioxide ($CO_2$) from the air and forms calcium carbonate.

Combustion is the process of burning waste fuel in the combustor. Other words may be used as pyrolysis, gasification and incineration. At about 400° C., the term pyrolysis is often used, at above 600° C. gasification is used and then again at +800° C. incineration is used. In this application the word "combustion" is used to covers all of these.

The waste fuel is material that can be burned to increase the temperature in the combustor to reach the required combustion temperature to obtain the preselected process temperature for the waste minerals to be treated. The waste fuel may be wood, or any kind of waste material, which may be at least partly burned.

Waste material refers to any material that is discarded or no longer needed, and considered as unwanted or unnecessary. Waste material comprises garbage, waste and any material that is no longer needed. Waste materials can come from a variety of sources, including households, industrial and commercial operations, construction sites, and agriculture. The waste material may comprise waste fuel and/or waste minerals. Waste material is material that has been used, and which may contain waste minerals, which may be recycled.

The waste material may comprises waste minerals. Waste minerals are waste comprising non-combustible minerals, which may be recovered and recycled. The waste mineral may for instance comprise mineral wool or cementitious material.

The waste material may comprises waste fuel. Waste fuel is waste, which may be burned to generate heat. The waste fuel may comprise wood, plastic, paper and other combustible materials.

The combustion temperature in the combustor is controlled to obtain the preselected process temperature by regulating the amount of waste fuel, the amount of flue gas, the temperature of the supplied flue gas and the oxygen level in the combustor. The flue gas supplied to the combustor is contribution to regulate the oxygen level as the supplied flue gas dilutes the oxygen and thereby reduces the relative level of oxygen.

Controlling the combustion temperature in the combustor may further comprise regulating the temperature of the recycled flue gas and/or the oxygen supplied to the combustor.

Regulating the temperature of the recycled flue gas and/or the oxygen may be preheating or precooling of the flue gas and/or the oxygen.

For instance the oxygen and/or the recycled flue gas may be preheated to a temperature of 600° C.

The preselected process temperature is the target temperature for the combustion. The preselected process temperature depends on the waste minerals to be treated and the desired recyclable product to be achieved. The process temperature is controlled by supplying waste fuel, for combustion, flue gas and oxygen to the combustor for the combustion temperature to reach the preselected process temperature. The temperature of recycled flue gas may be lower than the preselected process temperature and is rewarmed in the combustor, but flue gas delivered from another combustor may be hot and contributes to heating the combustor.

The waste minerals and the waste fuel is mixed together before it enters the combustor or in the entry zone of the combustor. The waste minerals and the waste fuel may be part of the same original waste material for instance building waste, from which some parts are recyclable minerals, and therefore are waste minerals, and other parts can burn, and therefore are waste fuel. The waste minerals and the waste fuel may also be from separate origin, where the waste minerals for instance may be mineral wool and the waste fuel may be any waste material, for instance wood, which can burn.

Depending on what minerals to process as waste minerals, the combustion temperature, the oxygen level and the carbon dioxide level in the combustor may be regulated to fulfil the requirements for the minerals to be processed.

The oxygen may be added in the entry zone in order to create an ignition zone with highly elevated oxygen level >25% and in some cases >40% in order to make faster ignition of non-grinded waste fuels possible. The combination of the waste fuels ignition temperature, the flue gas temperature and the oxygen level determines the combustibility of the waste fuel.

The combustor may be a rotating oven, often called a rotary kiln, or alternatively it may be a fluid bed, a vertical calciner, a flash calciner or others. In a rotating oven, the waste minerals and the waste fuel may be supplied to the rotating oven in one end, and then slowly slides through the rotating oven, while being combusted or heated, towards the opposite end of the rotating oven, where the residual material leaves the oven. Different processing times may give different outcomes. Depending on the material, the processing times may be anything from a few seconds to several hours. If the waste minerals are comminuted material the processing time may be a few seconds if calcination is used or half an hour to a few hours if a rotating oven is used. If the waste mineral in not comminuted, for instance it may be a plate of a thickness of 1 cm the processing time, it may be 1-2 hours, for thicker plates several hours. The processing time is the time the waste mineral is in the combustor. The processing time is preselected. The residual material is removed from the combustor when the processing time has elapsed.

The residual material is what remains of the waste mineral and the waste fuel. The waste mineral cannot burn and has therefore been heated, while the waste fuel has burned.

However, there may be metal, stones or other non-combustible materials that was in the waste fuel.

Recovering the recyclable product may comprise cooling the residual material, and carbonating the residual material. Recovering the recyclable product may further comprises crushing the residual material and removing metals, stones, and/or other impurities by an arrangement for recovering the recyclable product from the residual material to obtain the recyclable minerals, which is the recyclable product. The arrangement may comprise magnets and/or sieves. The recyclable product may be crushed so the minerals are so finely divided or comminuted that it can pass through a sieve, and metals are released from the residual material so the metals may be removed by magnets.

By heating the waste minerals, water, which has been bonded in the waste minerals, are released from the waste minerals, and carbon dioxide, which may have bonded with the waste minerals during curing, may also be released. Depending on the combustion temperature, carbon dioxide either may be released by the minerals at higher temperatures or absorbed by the minerals at lower temperatures. In addition, organic content in the waste minerals is gasified and combusted thus contributing to create the content of carbon dioxide in the flue gas. Therefore, the combustion temperature and the oxygen level in the combustor must be controlled to fit the waste minerals being treated and the recyclable product to be achieved.

The combustor may be a part of a closed system, wherein all gasses and materials are kept in the system, and during operation preferable no gasses escape to the atmosphere. The constituents of the gasses are all absorbed by scrubbing or condensed by cooling and/or compression techniques. Water vapour or carbon dioxide may be released to the atmosphere during start up or close down of the system or for safety reasons due to equipment failure, for instance if the pressure in the system becomes too high.

The waste minerals and the waste fuel are supplied to the combustor from feeders. The feeders supply waste fuel for burning, to reach the preselected process temperature, and waste minerals for treating and recovering.

Oxygen is supplied to the combustor to facilitate oxidising the waste minerals and for the combustion temperature to reach the preselected process temperature.

The removed flue gas from the process is recycled. The flue gas is removed from the combustor, and it may be recycled and used for other processes in one or more subsequent combustors or other devises. The recycled flue gas may be supplied to a subsequent combustor to add heating or cooling to the subsequent combustor. The gasses and water vapours in the flue gas may be removed from the flue gas. The flue gas may also be recycled back to the combustor, where it came from.

The flue gas, comprising carbon dioxide, supplied to the combustor may elevate the level of carbon dioxide in the combustor to reach an elevated carbon dioxide level. The amount of flue gas and carbon dioxide to be supplied to the combustor may depend on the recyclable product to be obtained.

The recycled flue gas supplied to the combustor may be flue gas, where the carbon dioxide level in the flue gas may have been elevated by removing water vapour and possible other gasses from the flue gas, before the flue gas is returned to the combustor. Further, the recycled flue gas supplied to the combustor may be hot flue gas. The hot flue gas may be supplied from another combustor.

An elevated level of carbon dioxide is to be understood as that the level is higher than it would be, if flue gas with an elevated carbon dioxide level were not supplied to the combustor, and the waste was combusted under normal conditions using air as the oxygen source. When supplying flue gas comprising carbon dioxide to the combustor, the carbon dioxide level in the combustor may be elevated relative to the carbon dioxide level, before the flue gas was supplied to the combustor.

The elevated carbon dioxide level facilitates carbonatation by reaction between carbon dioxide and the waste minerals depending on the temperature.

The level of carbon dioxide may be regulated by also removing, at least partly, carbon dioxide from the flue gas and by removing water vapour by condensation to keep a balance in the carbon dioxide level in the combustion process to avoid elevating the carbon dioxide content in the flue gas to a too high level. The same amount of carbon dioxide may be removed from the flue gas as is created in the combustion process.

When the waste minerals have been treated for the required time, under the given conditions, the recycled material is removed from the combustor and into the cooler, where the waste minerals may absorb further carbon dioxide.

Subsequently, after cooling the recycled minerals, it may be cleaned by removing metals, stones and other impurities to recover the recyclable product.

According to an embodiment, the method further comprises placing the removed residual material in a cooler.

The waste minerals may be moved to a cooler, where it is cooled down.

The residual material removed from the combustor may be placed on a screw conveyer that goes into and through a cooler, or the residual material may be dropped from the combustor directly into the cooler. The cooler may comprise means to move the residual material through the cooler; the means may be a screw conveyer.

Alternatively, the cooler may be a rotary kiln, receiving the material to be cooled, and the material is moving through the cooler by the rotation of the rotary kiln to an outlet, where the cooled residual leaves the rotary kiln.

According to an embodiment, the method further comprises supplying flue gas containing carbon dioxide to the cooler.

Recycled flue gas containing carbon dioxide is supplied to the cooler for facilitating carbonatation to take place in the cooler.

According to an embodiment, the method further comprises cooling the residual material to obtain a temperature, at which the waste minerals absorbs carbon dioxide by carbonatation.

The waste minerals may absorb carbon dioxide at a lower temperature than the combustion temperature; therefore, the waste minerals needs to be cooled before it can absorb carbon dioxide by carbonatation.

The residual material may be cooled to between 150° C. and 200° C. for optimizing the carbonatation process. But cooling to temperatures between 200° C. and 650° C. may also be sufficient for carbonatation. However, by cooling to the low temperature in the cooler ensures to maximize the uptake of carbon dioxide in the carbonatation process.

The cooling may be performed in more steps using recycled flue gas with different temperatures.

The cooling may be done in a cooler, but a cooler is not necessarily needed for cooling the waste minerals, for instance cooling means could be added to the end of the combustor, so that the temperature in the combustor is lower at the end, where the residual material leaves the combustor.

If the combustion temperature in the combustor is low, cooling may not be needed, like for instance at a combustor temperature of 400° C., some minerals may be reactivated by dehydrogenation and thus able to absorb carbon dioxide.

The invention is particularly, but not exclusively, advantageous for obtaining recyclable product from waste minerals by treating waste minerals by heating the waste minerals under increased levels of oxygen and/or carbon dioxide, and cooling the residual material under the presence of carbon dioxide for carbonatating the minerals in the residual material.

According to an embodiment, the method further comprises cleaning the flue gas removed from the combustor by removing, at least partly, excess gases and dust particles from the flue gas.

Cleaning the flue gas by removing excess gases and dust particles comprises removing NOx, SOx, HCl and/or NH3. NaOH, KOH, CaOH or other basic reactant is added in the cleaning process in order to neutralize the removed acidic gases during the cleaning process.

There may also be dust particles in the flue gas, these particles may be removed with a filter, which catches the particles when the flue gas passes through the filter.

Also, water vapour is removed from the flue gas by leading the flue gas through a condenser, where the water vapour is condensed to a liquid.

By removing gasses and water vapour from the flue gas, the level of carbon dioxide in the flue gas is increased, so when the flue gas is returned to the combustor, it will elevate the level of carbon dioxide in the combustor.

Removing excess gases comprises removing excess carbon dioxide from the flue gas. Some of the carbon dioxide may be removed from the flue gas, before the flue gas is returned to a combustor or a cooler to obtain a carbon dioxide level in the flue gas to fit the requirement for carbon dioxide and to remove the carbon dioxide continuously from the process in order to achieve balance between input and output of carbon dioxide. This leaves a higher level of oxygen in the flue gas, which is relevant when a higher level of oxygen in the combustor is preferred. When cooling and compressing the flue gas, maybe 90% of the $CO_2$ is condensed and the last 10% stays in the gas phase as per equilibrium conditions. The efficiency is dependent on the system used for this process. The carbon dioxide staying in the flue gas is recycled back into the process.

The removed carbon dioxide may be stored in a carbon dioxide storage and may be used for other purposes.

According to an embodiment, the method further comprises cooling the flue gas removed from the combustor to a preselected cooling temperature.

The preselected cooling temperature may by 150° C.-200° C. The flue gas is cooled down, so it may be used for cooling in the coolers or in the combustors. Cooling to 150° C. ensures that no condensation happens and thus the full water content is recycled. However cooling to below the dew point before recycling in order to reduce water content may also be a solution as this increases carbon dioxide concentration in the gas phase for the process According to an embodiment, the method further comprises cooling the residual material with the cooled flue gas comprising carbon dioxide.

The flue gas has an elevated content of carbon dioxide, so when cooling the residual material with the cooled flue gas, at the same time the minerals in the residual material may absorb carbon dioxide from the flue gas carbonatating the mineral.

Cooling of the residual material under the presence of carbon dioxide may therefore be an essential process for carbonatation of the minerals in the residual material, and the option to cool the residual material under presence of carbon dioxide is advantageous for obtaining recyclable product from waste minerals.

According to an embodiment, the method further comprises supplying oxygen to the cooler for forming $NO_2$ from nitrogen compounds like $N_2$, NO, $N_2O$ in the flue gas, and removing the $NO_2$ from the flue gas by scrubbing with water comprising dissolved NaOH or KOH.

In addition, oxygen may be added to the cooler, preferable to obtain an oxygen content up to 40%. The flue gas comprises a mixture of nitrogen compounds $N_2$, NO, $N_2O$, $NO_2$. $NO_2$ is soluble in water and may be removed from the flue gas in a flue gas scrubber at pH>7, or preferable at pH>9. Typically, the concentration of $NO_2$ is too low for cleaning of flue gas. In the process of the invention, however there are good conditions for oxidation of NO to form $NO_2$. Further, the particles in the flue gas may work as catalysts for the $NO_2$ formation. The oxygen reacts with the nitrogen compounds in the flue gas to create $NO_2$. The $NO_2$ later in the process may be scrubbed with water comprising dissolved NaOH or KOH for elevated pH, while at same time forming $NaNO_3$ or $KNO_3$ in the solution in the second scrubber and thereby the $NO_2$ is being removed from the flue gas. Not all nitrogen compounds may be removed in the scrubbing but is recirculated and later returns to the coolers where the oxidising conditions further converts nitrogen compound into $NO_2$, creating a balance between the added nitrogen in the combustion process and the removed $NO_2$.

According to an embodiment, the method comprises supplying waste minerals and waste fuel to the combustor comprises one or more feeders, the feeders are continuously supplying of waste minerals and waste fuel to the combustor.

The waste minerals and the waste fuel may be grinded if needed and filled into buffers, which deliver the waste minerals and the waste fuel to feeders. The feeders supplies the waste minerals and the waste fuel to the combustor. The waste minerals and waste fuel may be mixed on entry into the combustor. The mixture is made so the content of waste fuel supports reaching the preselected process temperature by adding the needed amount of waste fuel to the mixture to obtain the preselected process temperature. When a higher temperature is needed, more waste fuel is added to the mixture, while when a lower temperature is needed less waste fuel is added to the mixture.

According to an embodiment, the method comprises recycling flue gas comprises receiving hot flue gas from a subsequent combustor and/or supplying flue gas to a subsequent combustor.

There may be more combustors, which are connected so that hot flue gas may be led from one combustor to another combustor. The advantage is that the flue gas in one combustor has a high temperature, which may be used to heat another combustor, which need a lower temperature, so that the amount of waste fuel can be reduced in the combustor receiving the flue gas.

According to an embodiment, the method comprises that the waste minerals comprises mineral wool, the recyclable product to be obtained is a silicate, and the method comprises oxidising the waste minerals by supplying oxygen to the combustor to obtain a preselected oxygen level.

A silicate is a compound that contains silicon(S) an oxygen (O) atoms in combination with different anions (M) described in general by $Si_xO_yM_z$.

In one embodiment, the waste minerals comprises mineral wool. From mineral wool, a silicate may be obtained by oxidising the mineral wool. The mineral wool, when heated, reacts with oxygen to form a silicate.

Mineral wool waste from primarily the building industry contains impurities like wood, metal, concrete, glass etc. The woolly structure of the mineral wool makes it difficult to clean out the impurities before processing. However, with thermally processed at temperature above 400° C., the binder in mineral wools, Bakelite or others, will gasify, and make it easier to sort out the impurities using magnets and crushing and sieving. Wood and plastics will also gasify. Glass fibre reinforced plastics is not easily recycled in its original form, however when treated at temperatures above 400° C. the same will happen as for mineral wool. The result in both cases are released glass/stone minerals that can be cleaned and recycled as raw materials in the building industry.

The gasified organics from the raw materials can be combusted in traditional ways in order to reach temperature above 850° C. for more than 2 seconds as required for waste incineration.

According to an embodiment, the method comprises that the preselected oxygen level is higher than 15%, preferable higher than 20%, more preferable higher than 25%.

For oxidation of the mineral wool to silicates to be efficient, the oxygen level in the combustor preferable is increased to be higher than 15%. Even though oxidation may also occur at a lower oxygen level, the efficiency of the oxidation may increase at higher oxygen levels. However, the oxygen levels also affects the combustion, and the presence of oxygen may affect the combustion temperature. Therefore, the oxygen levels is chosen to fit both the oxidation process and the combustion temperature.

By increasing the oxygen level, oxidising the mineral wool into a silicate, the invention increases the melting temperature of the waste minerals and thereby allowing a higher temperature for thermal treatment of the mineral wool. Also by increasing the oxygen level, it is avoided that the oxygen level is reduced due to the combustion of the waste fuel to a level where the minerals does not oxidise and instead reaches the melting point of the original minerals.

According to an embodiment, the method comprises that the preselected process temperature is between 400° C. and 1500° C.

According to an embodiment, the method comprises that the preselected process temperature preferable is between 650° C. and 1200° C.; more preferable is between 850° C. and 1050° C.

For mixtures of stone- and glass wool process temperatures above 850° C. is expected to be the preferred. For glass wool a temperature at 650° C. may be sufficient, but for stone wool a temperature of at least 850° C. is required to evaporate or combust plastic and organic compounds in the minerals.

An advantage of the invention is that by increasing the oxygen level for oxidising the mineral wool, mineral wool can be processed without melting into liquid glass, which makes subsequently handling much more difficult. The potential carcinogenic fibres are destroyed by the oxygenation.

At lower temperatures, e.g. 400° C., oxygen levels above 15% may reduce oxidation time. Increasing the oxygen content and ultimately to near 100% may maximize oxidation speed. At higher temperatures oxygen levels may need to be reduced in order to reduce combustion speed of combustible impurities in order to not reach too high temperature.

The process removes organic materials, like Bakelite, binders, plastic, wood, paper etc. from the mineral wool, so the surface of the mineral wool or silicate is clean and can bind to concrete or cement.

According to an embodiment, the recyclable product comprises pozzolanic silicates.

The pozzolanic silicates may be used as pozzolanic material in e.g. concrete. The pozzolanic material reacts with calcium hydroxide to cementious substances. The pozzolanic silicates can be used as a filler in cements, and it helps to increase the strength of cement, concrete or mortar when added to it. It is also used to reduce the permeability of concrete and improve its durability.

According to an embodiment, the method comprises that the waste minerals comprises cementitious material, the recyclable product to be obtained is a reactivated cementitious material, and the method comprises carbonatation of reactive oxygen groups in the reactivated waste minerals by supplying carbon dioxide to obtain an elevated carbon dioxide level during carbonatation.

In this embodiment, the waste minerals may be a cementitious material. In some waste from buildings, there often is a lot of cementitious material. The cementitious material may be hydrated, and therefore may only by recycled as a filler without any reactivity. However, the method of this invention may reactivate the cementitious material by dehydrogenation of the cementitious material, removing the water absorbed by the cementitious material, and further carbonatation of the cementitious material by supplying carbon dioxide. The carbon dioxide bonds with the cementitious material to create carbonated cement. The method removes water by heating the cementitious material and replace it with carbon dioxide.

The carbonatation may take place in the combustor or the reactivated waste minerals is moved to a cooler, and the carbonatation may take place in the cooler.

The carbon dioxide is supplied to the combustor. However, also carbon dioxide may be supplied to the cooler. The carbon dioxide level in the combustor and/or in the cooler may be elevated.

Sintering of fibre cement at the right temperatures will reactivate the cementitious parts of the fibre cement creating a new ready mix cement mineral with pozzolanic properties. The same will be the case with other cementitious waste products.

According to an embodiment, the method comprises that the elevated carbon dioxide level is by volume higher than 20%, preferable higher than 35%, and even more preferable higher than 50%.

Carbonatation of the cementitious material may be more efficient at high levels of carbon dioxide. Preferable at least 20% carbon dioxide, but even higher levels of carbon dioxide may facilitate a faster and more efficient carbonatation. However, the carbonatation process also occurs at lower carbon dioxide levels less than 20%, but takes longer time.

Using waste fuel in an oxidized atmosphere with an oxygen level between 10% and 20% is preferable for treating a cementitious material.

The elevated carbon dioxide level may be in the combustor and/or in the cooler.

According to an embodiment, the method comprises that the preselected process temperature is between 400° C. and 1400° C., more preferable between 600° C. and 900° C.

For cementitious material, a temperature of 400° C. is sufficient to remove water bonded to the cementitious material. However, at a higher temperature the process may be faster and more efficient. There seems to be a peak in efficiency around 800° C.

The method may also comprise cooling the reactivated cementitious material with flue gas comprising carbon dioxide for carbonatation of the reactivated cementitious material.

At 700° C. and lower temperatures however, the temperature is sufficient low for carbon dioxide to bond with the cementitious material. Therefore, at or below 700° C. the process may both remove water from the cementitious material and add carbon dioxide to the cementitious material. In this case cooling the cementitious material before it can be carbonated may not be needed.

In a second aspect, the invention relates to a system for obtaining a recyclable product from waste minerals by heating a combustor by combusting waste fuel in the combustor, the system comprises:
- a supplying arrangement arranged to supply waste minerals and waste fuel to the combustor,
- an oxygen supply arranged to supply oxygen to the combustor to obtain a preselected oxygen level,
- a gas outlet arrangement to remove flue gas comprising carbon dioxide from the combustor for recycling,
- a gas inlet arrangement to supply recycled flue gas comprising carbon dioxide to the combustor,
- a controller arranged to control the combustion temperature in the combustor to obtain the preselected process temperature by combusting waste fuel, and by controlling the amount of waste fuel and flue gas supplied to the combustor to obtain the preselected process temperature,
- a removal arrangement arranged to remove residual material from the combustor, the residual material is the material remaining after combusting the waste minerals and the waste fuel, and
- means arranged to recover the recyclable product from the residual material.

The supplying arrangement for supplying waste minerals and waste fuel to the combustor typically may be feeders, which is continuously supplying waste minerals and waste fuel to the combustor.

The oxygen supply may be comprising a valve to open for oxygen passage into the combustor, a pressure difference between the oxygen supply and the combustor may drive the entry of oxygen to the combustor.

The removal arrangement for removing residual material from the combustor may be an opening in the end of the rotating kiln, from where the residual material falls onto a conveyer, which leads the residual material into a cooler, or preferable the residual material may fall directly out of the combustor and into the cooler, where there may be a conveyer, alternatively the cooler is a rotary oven, leading the residual material through the cooler.

The cooler may have an extraction system to regulate retention time of the minerals in the cooler. The cooler temperature may be regulated by the recycling of cooled flue gasses.

Further, a gas outlet arrangement may remove gasses, including water vapour, carbon dioxide, acidic gasses and other gasses and airborne particles from the combustor. The gas outlet arrangement may comprise an exhaust system, which may include a fan or a pump. The gas outlet arrangement may comprise several outlets.

A gas inlet arrangement may supply flue gas to the combustor. The gas inlet arrangement may comprise several inlets.

Recovering the recyclable product comprises removing metals, stones, and/or other impurities from the recyclable product. Means arranged to recover the recyclable product from the residual material may be a recovery arrangement. The arrangement may crush the residual material to comminute the waste material and the arrangement may comprise magnets or sieves, but may also other devices suitable for removing metals, stones and/or other impurities from the residual material to obtain the recyclable minerals, which is the recyclable product.

The system is preferable a closed loop system, from which gasses and solid materials cannot escape avoiding pollution of the surroundings and the atmosphere. Water vapour and carbon dioxide may be released to the atmosphere in a controlled manner. Preferable water vapour will be condensed and reused for boiler feed water or raw water for hydrogen production and carbon preferably will be removed as a compressed liquid or used in another process. The water vapour is usually removed before carbon dioxide is removed. Some carbon dioxide and water vapour may not be removed from the flue gas and may eventually be released as the main exhaust gas, however if there is sufficient cooling and carbon dioxide uptake there may not be any exhaust gas.

One or more controllers may be controlling the system, by measuring temperatures, oxygen levels, driving pumps, opening and closing valves, etc.

This aspect of the invention is particularly, but not exclusively, advantageous in that the method according to the present invention may be implemented by a system, which is in no contact with the atmosphere and the surroundings avoiding pollutions when in operation. At the same time, the system supplies all the means necessary for treating the minerals in the waste to become a recyclable product and also provides the means for recovering and storing the gasses generated in the process for recycling.

A third aspect of the invention relates to a control system for controlling obtaining a recyclable product from waste minerals, where the control system is arranged to perform the steps according to the method of the first aspect.

A fourth aspect of the invention relates to a computer program product comprising software code adapted to control obtaining a reusable product from recycling material when executed on a data processing system, the computer program product being adapted to perform the method of the first aspect.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The method and system according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
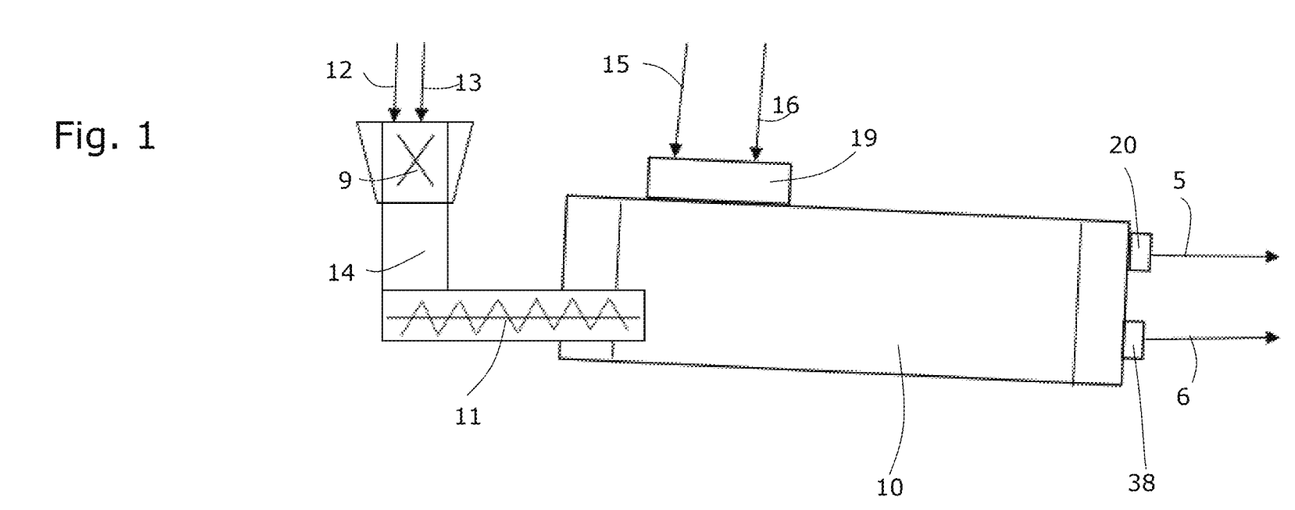
FIG. 1 shows the combustor of the invention.

FIG. 1 shows the combustor 10 of the invention. The combustor typical is a rotating oven. The combustor is supplied with waste minerals 12 and waste fuel 13, which may be grinded in grinders 9, but may also be non-grinded, and placed in buffers 14, where from feeders 11, is leading the waste minerals 12 and waste fuel 13 into the combustor 10 for combustion. In. FIG. 1 only one grinder, one buffer and one feeder are shown, but preferable there is two grinders, two buffers and two feeders, a grinder, a buffer and a feeder for both the waste minerals and the waste fuel. The waste minerals 12 and waste fuel 13 may be mixed together at entry into the combustor. The waste fuel is combusted in the combustor creating the heat in the combustor. The waste minerals are not combustible, but is treated by the heat; specifically the heat removes water from the waste minerals. The waste fuel and the waste minerals are supplied to the combustor in an amount and speed suitable for the combustion process. The waste fuel and waste mineral is combusted in the combustor, the waste fuel is burned and delivers heat to treat the waste minerals.

Also concentrated oxygen 15 and recycled flue gas 16 comprising carbon dioxide and water vapour is supplied to the combustor 10. The oxygen and the carbon dioxide is affecting the combustion process and may be treating or reacting with the waste minerals. The recycled flue gas is supplied from a gas inlet arrangement 19, which may comprises tubes or valves for supplying flue gas from one or more different sources. The oxygen 15 in this embodiment also is supplied through the gas inlet arrangement 19, and may be mixed with the flue gas before entering the combustor. After completing the combustion process, the residual material 6 is led away from the combustor by a removal arrangement 38. The removal arrangement may be a feeder, or it may just be an opening for the residual material to fall out of the combustor and into the cooler.

The residual material is further treated to extract the recyclable product. In addition, the hot flue gas 5, created by the combustion process, is led away from the combustor and further treated, removing some of the content of the flue gas, before the remaining flue gas is returned to the combustor as recycled flue gas 16. The hot flue gas is removed from the combustor by a gas outlet arrangement 20, which may comprise tubes, pumps, valves and/or other devices for removing flue gas. The recycled flue gas may contain a higher content of carbon dioxide to elevate the level of carbon dioxide in the combustor and the coolers. By removing water vapour and other gasses from the flue gas, the content of carbon dioxide in the flue gas is elevated. It is also possible to remove carbon dioxide from the flue gas, but this is not done, when it is needed to elevate the carbon dioxide level, but may be done to keep a balance in the carbon dioxide level.

Figure 2:
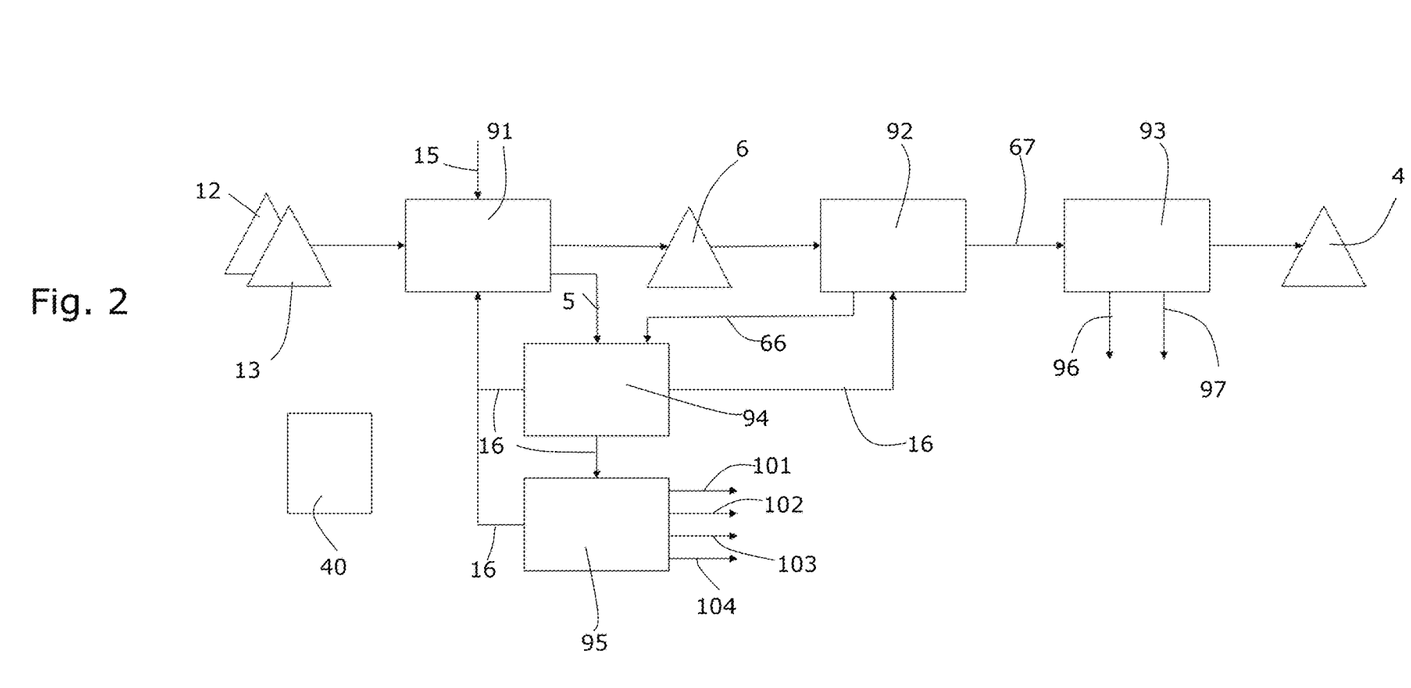
FIG. 2 shows an overview of the system for applying the method of the invention.

FIG. 2 shows an overview of the system for applying the method of the invention. Waste minerals 12 and waste fuel 13 is supplied to the heating process 91. The heating process comprises the steps of supplying waste minerals 12, waste fuel 13, oxygen 15, from an oxygen supply 18, and flue gas 16 to the combustor and removing hot flue gas 5 and the residual material 6 from the combustor and controlling the temperature, the oxygen level and the carbon dioxide level in the combustor. In the heating process 91 the waste minerals are heated, by which water is removed from the minerals, further the minerals may be oxidised by the oxygen and carbonated by the carbon dioxide.

The residual material 6, when removed from the combustor and the heating process 91, is moved to a material cooling process 92. The cooling process is performed by adding cooled flue gas 16 with a content of carbon dioxide to the process, which may occur in a cooler. The cooled flue gas 16 is cooling the residual material and may react with the minerals in the residual material 6 to carbonatate the minerals.

After the cooling process, the cooled residual material 67 is going through a cleaning process 93, removing metals 96 and other materials 97 from the cooled residual material, so the process ends up with having the recycled product 4.

From the heating process 91, also flue gas 5 is removed from the process. The flue gas is cooled in a flue gas cooling process 94. From the flue gas cooling process 94, cooled flue gas 16 is supplied back to the heating process 91, to the material cooling process 92 and to a flue gas treatment process 95. Excess flue gas 66 from the material cooling process 92 may pass to the flue gas cooling process 94.

In the flue gas treatment process 95, different gasses and materials are removed from the flue gas, like for instance gasses 101, like NOx, SOx, HCl and $NH_3$, water vapour 102, and some of the carbon dioxide 103 and possible other airborne particles 104. The remaining flue gas 16 is returned to the combustor in the heating process 91.

A controller 40 is controlling the method and the system be receiving and controlling parameters in different places in the system. This may be measurements of temperatures, pressures and oxygen levels, controlling valves and supply of waste minerals and waste fuel, oxygen, flue gas and much else in the system. There may be several controllers in the system working together to control the system.

Figure 3:
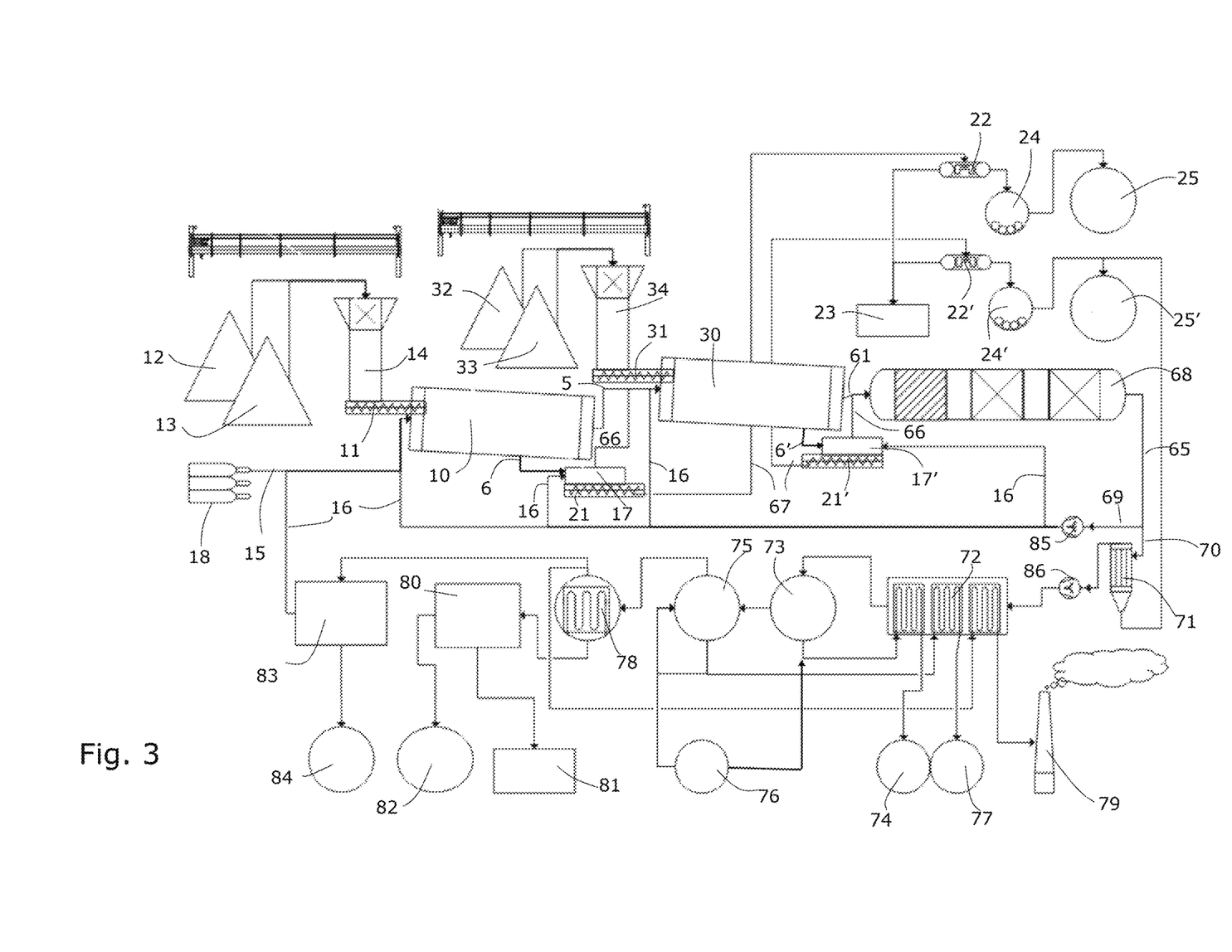
FIG. 3 shows a detailed system with two combustors for applying the method of the invention.

FIG. 3 shows a detailed embodiment of the system with two combustors. The system comprises a combustor 10 and a subsequent combustor 30. The waste minerals 12 and the waste fuel 13 are placed in buffers 14, 34; only one buffer is shown for each combustor 10, 30. However, preferable, there are two buffers for each combustor, one for waste minerals and one for waste fuel. The combustor 10 comprises a feeder 11 for supplying waste minerals 12 and waste fuel 13 to the combustor. Only one feeder 11, 31 for each combustor 10, 30 are shown in FIG. 1, but preferable, there may be two feeders for each combustor, one for supplying waste minerals and one for supplying waste fuel. Then the waste minerals and the waste fuel may be mixed at entry into the combustor.

Regarding the combustor 10, waste minerals 12 and waste fuel 13 enters the feeders 11. The feeders 11 supplies the waste minerals 12 and the waste fuel 13 to the combustor 10. In the combustor 10 is also supplied oxygen 15 and recycled flue gas 16. The waste minerals 12 and waste fuel 13 enters the combustor continuously, and when the combustor is a rotating oven, the waste minerals 12 and waste fuel 13 slowly moves through the oven to the opposite end, while the waste fuel is combusting and the heat, the oxygen and the carbon dioxide are treating the waste minerals. At the opposite end, the residual material 6 leaves the combustor 10. A rotating kiln has a slope, such that the material in the kiln moves through the oven during the combustion process due to gravity.

In the combustor 10, the waste minerals 12 and the waste fuel 13 are combusted at a preselected temperature and a preselected oxygen level.

Hot flue gas 5 from the combustor 10 is supplied to the subsequent combustor 30. Concentrated oxygen 15 (not shown) and recycled flue gas 16 are also led to the subsequent combustor.

The subsequent combustor 30 also comprises a feeder 31, preferable two feeders, for supplying waste minerals 32 and waste fuel 33 to the subsequent combustor. The waste minerals 32 and the waste fuel 33 are placed in a buffer 34, preferable two buffers. From the buffer 34 the waste minerals 32 and the waste fuel 33 enters the feeder 31, preferable two feeders, where it is gradually led into the subsequent combustor 30.

After the combustion in the combustor 10 the residual material 6, which is what remains of the waste minerals and the waste fuel, is moved from the combustor to the cooler 17. In the cooler 17 cooled flue gas 16 is added to the cooler 17 to cool down the residual material. During the cooling, the minerals in the residual material may absorb carbon dioxide from the flue gas when carbon dioxide rich flue gas is added. The cooler 17 comprises a conveyer 21, moving the residual material 6 from the combustor 10 and to the cooler 17, through the cooler and out of the cooler as cooled residual material 67. The excess flue gas 66 is leaving the cooler 17 and goes to either the subsequent combustor 30 or the steam boiler 68.

After combustion in the subsequent combustor 30 the residual material 6' passes to the cooler 17'. Flue gas 16 is added to the cooler 17'. The cooler 17' comprises a conveyer 21'. The residual material 6' is cooled down and leaves the cooler 17' as cooled residual material 67. The excess flue gas 66 from the second cooler 17' is moved to the steam boiler 68.

Figure 4:
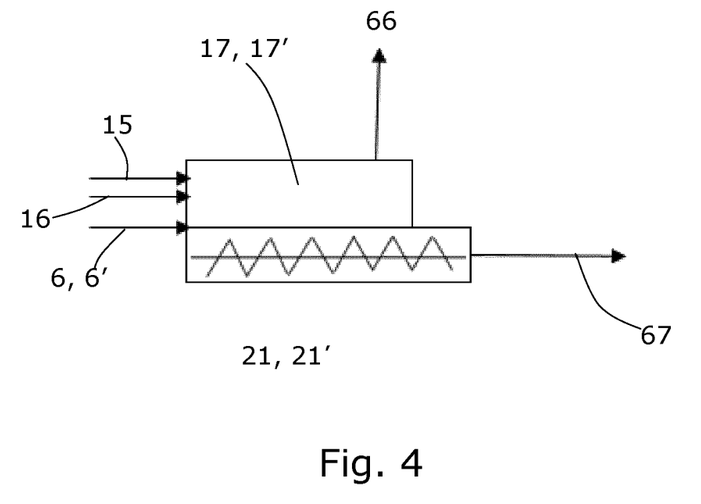
FIG. 4 shows the cooler.

In addition, oxygen 15 may be added to the coolers 17, 17'. This is not shown in FIG. 3, but is shown in FIG. 4. The oxygen reacts with the NO in the flue gas to create $NO_2$. The water soluble $NO_2$ later in the process may be scrubbed by high pH water with dissolved NaOH or KOH in the second scrubber 75, where the OH groups neutralizes the $NO_2$ to form $NaNO_3$ and thereby removing the $NO_2$ from the flue gas.

The waste minerals 12 for the combustor 10 may be mineral wool and the waste fuel for the combustor 10 may be any waste material suitable for combustion. The waste minerals 32 for the subsequent combustor 30 may be a cementitious material mixed with other building waste, which then is at least part of the waste fuel 33. Hot flue gas 5 from the combustor 10 is passing to the subsequent combustor 30 contributing to heating in the subsequent combustor 30.

When leaving the coolers 17, 17', the cooled residual material 67 may be moved to a magnetic separator arrangement 22, 22', which removes metal from the residual material to a metal container 23. From the magnetic separator arrangement, the minerals are moved to a ball mill 24, 24', where the remaining minerals are crushed, and the minerals may be further cooled in the ball mill to reduce the temperature from about 150° C. to a more handy temperature. From the ball mill 24, 24', the resulting recyclable product 4 is moved to the silo 25, 25'.

Flue gas from the combustor 10 either passes to the subsequent combustor 30 or is led through a channel (not shown) to the steam boiler 68. From the additional combustor 30 the flue gas passes to a steam boiler 68 through the channel 61, where the flue gas is cooled down to 180° C.

From the steam boiler 68, the cooled flue gas 16 is led through the channel 65 either to a flue gas return channel 69 or to a gas treatment channel 70 to the gas treatment system.

Both the flue gas return channel 69 and the gas treatment channel 70 comprises pumps 85, 86. The pumps is pumping the flue gas through the systems and is increasing the pressure, to ensure the pressure in the flue gas return channel 69 and the gas treatment system 70 is higher than in the combustors 10, 30 and the coolers 21, 21', to ensure the returned flue gas passes into the combustors 10, 30 and the coolers 21, 21'.

In the gas treatment system, the flue gas first go to a filter 71 for removal of small particles and dust, from the filter 71 the flue gas is led to a heat exchanger 72, where the flue gas may be further cooled. The flue gas passes through the heat exchanger to a first scrubber 73, where flue gas is led through a liquid, preferable water, in the scrubber, with a pH between 1 and 4, and NaOH is added from the tank 76. The HCl in the flue gas is partly neutralized by the NaOH and thereby removes HCl from the flue gas, creating a solution of NaCl, which is led to the NaCl tank 74 after being concentrated by evaporation in the heat exchanger 72. From the first scrubber 73 the remaining flue gas is led to the second scrubber 75, where the flue gas is led through a liquid, in the scrubber, with a pH above 8 to remove $NO_2$ and $SO_x$. In addition, NaOH or KOH is added to the second scrubber from the NaOH tank 76. In the second scrubber 75 a solution of $NaNO_3$ and $NaSO_4$ is extracted and created from the flue gas, the $NaNO_3$ and $NaSO_4$ is led to the tank 77 after passing through the heat exchanger 72 for concentration by evaporation.

From the second scrubber 75 the remaining flue gas is led through a condenser 78, wherein water vapour is condensed to water and removed from the flue gas. Water vapour and gases that not have been condensed, and not are needed for the combustors, may be led to the heat exchanger 72, where it is used to cool the flue gas and is released through the chimney 79 to the atmosphere. Also from the condenser 78 water and impurities, trace metals, residual sulphur and chlorine etc. are removed to the condensate cleaning process 80. Solids are removed and stored in the solid waste container 81, while the water, which has been cleaned to an extent that makes the water reusable as boiled feed water or raw water for hydrogen production, is placed in the water storage 82.

The remaining flue gas from the condenser 78 may continue to the carbon dioxide treatment 83, where most of the carbon dioxide may be removed from the flue gas and stored in the $CO_2$ storage 84, while the remaining carbon dioxide is led back into one of the combustors 10, 30 and/or one of the coolers 17, 17'. However, the flue gas may also continue back into the combustors or coolers without removing any of the carbon dioxide to elevate the carbon dioxide level in the combustors and/or coolers. There may be valves on the carbon dioxide inlets to the combustors 10, 30 and coolers 17, 17' to regulate the amount of flue gas allowed to pass into the combustors 10, 30 and coolers 17, 17' to control the carbon dioxide level in the combustors 10, 30 and coolers 17, 17'.

Flue gas returning from the flue gas return channel 69 typically has a temperature between 150° C. and 200° C., while flue gas returning from the gas treatment system 70 has a considerable lower temperature around 75° C. By choosing flue gas from returning from the flue gas return channel 69 or from the gas treatment system 70 the temperature in the coolers can be regulated to a higher or a lower temperature depending in the source of the recycled flue gas.

FIG. 4 shows the cooler of the invention. The cooler 17, 17' is supplied with the residual material 6, 6' from the combustor. Further, cooled flue gas 16, comprising carbon dioxide, and oxygen 15 are supplied to the cooler. In the cooler, the residual material may absorb carbon dioxide in a carbonatation process. The cooled residual material 67, after cooling, leaves the cooler 17, 17' and is moved to the magnetic separator arrangement 22 (FIG. 3). The excess flue gas 66 also leaves the cooler and passes either to a subsequent combustor 30 or to the steam boiler 68 (FIG. 3). The cooler further comprises a screw conveyer 21, 21' to feed the cooler with the residual material 6, 6'.

Figure 5:
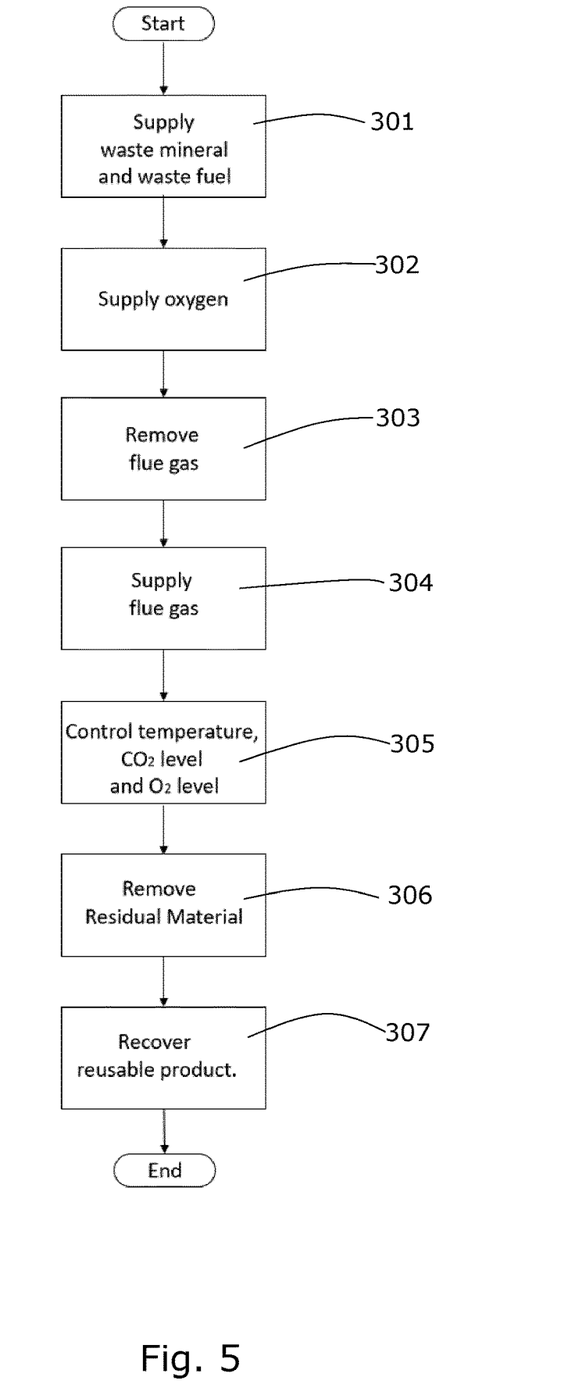
FIG. 5 is a flow-chart illustrating the method of the invention.

FIG. 5 is a flow diagram illustrating the method of the invention. In the material supply step 301, waste mineral and waste fuel are supplied to the combustor. Oxygen is supplied to the combustor in the oxygen supply step 302. Flue gas from the combustion in the combustor is removed from the combustor in the flue gas removal step 303. In the flue gas return step 304, recycled flue gas is supplied to the combustor. In the control step 305 the temperature and the oxygen level in the combustor is controlled by regulating the amount of waste fuel, the amount of oxygen and further supplying carbon dioxide containing flue gas to the combustor is controlled. In the remove residual step 306, the residual material, which is the remains of the waste mineral and waste fuel after combustion, is removed from the combustor. In the recover step 307 the recyclable product, which is the remains of the waste minerals, is recovered. The recovery process may include cooling of the residual material, carbonatating the residual material and cleaning the residual material to remove remains like metal, stones, and other items etc. from the residual material to obtain the recyclable product.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

In other embodiments, the present invention also relates to:

E1. A method for obtaining a recyclable product (4) from waste minerals (12, 32) by heating a combustor (10, 30) by combusting waste fuel (13, 33) in the combustor; the method is comprising the steps:
  supplying waste minerals (12, 32) and waste fuel (13, 33) to the combustor,
  supplying oxygen (15) to the combustor (10, 30) to obtain a preselected oxygen level,
  removing flue gas comprising carbon dioxide from the combustor (10, 30) for recycling,
  supplying recycled flue gas comprising carbon dioxide to the combustor (10, 30),
  controlling the combustion temperature in the combustor (10, 30) to obtain the preselected process temperature by combusting waste fuel (13, 33), and by controlling the amount of waste fuel (13, 33) and flue gas supplied to the combustor (10, 30) to obtain the preselected process temperature,
  removing residual material (6, 6') from the combustor (10, 30), the residual material is the material remaining after combusting the waste minerals (12, 32) and the waste fuel (13, 33), and
  recovering the recyclable product (4) from the residual material (6, 6').

E2. The method according to embodiment E1, wherein the method further comprises placing the removed residual material (6, 6') in a cooler (17, 17').

E3. The method according to embodiment E2, wherein the method further comprises supplying flue gas containing carbon dioxide to the cooler (17, 17').

E4. The method according to any of the embodiments E1-E3, wherein the method further comprises the step:
  cooling the residual material (6, 6') to obtain a temperature, at which the waste minerals (12, 32) absorbs carbon dioxide by carbonatation.

E5. The method according to any of the preceding Embodiments, wherein the method further comprising the steps:
  cleaning the flue gas removed from the combustor (10, 30) by removing, at least partly, excess gases and dust particles from the flue gas.

E6. The method according to any of the preceding embodiments, wherein the method further comprising the steps:
  cooling the flue gas removed from the combustor (10, 30) to a preselected cooling temperature.

E7. The method according to any of the embodiments E2-E6, wherein the method further comprises the step:
  cooling the residual material (6, 6') with the cooled flue gas comprising carbon dioxide.

E8. The method according to any of the of the embodiments E2-E7, wherein the method further comprises the steps: supplying oxygen to the cooler (17, 17') for forming $NO_2$ from nitrogen compounds like $N_2$, NO, $N_2O$ in the flue gas, and removing the $NO_2$ from the flue gas by scrubbing with water comprising dissolved NaOH or KOH.

E9. The method according to any of the preceding embodiments, wherein supplying waste minerals (12, 32) and waste fuel (13, 33) to the combustor (10, 30) comprises one or more feeders (11, 11'), the feeders are continuously supplying waste minerals and waste fuel to the combustor.

E10. The method according to any of the preceding embodiments, wherein recycling flue gas comprises receiving flue gas from a subsequent combustor (30) and/or supplying flue gas to a subsequent combustor.

E11. The method according to any of the preceding embodiments, wherein the waste minerals comprises mineral wool, the recyclable product to be obtained is a silicate, and the method comprises oxidising the waste minerals by supplying oxygen to the combustor (10, 30) to obtain a preselected oxygen level.

E12. The method according to embodiment E11, wherein the preselected oxygen level is higher than 15%, preferable higher than 20%, more preferable higher than 25%.

E13. The method according to any of the embodiments E11 or E12, wherein the preselected process temperature preferable is between 650° C. and 1200° C., more preferable is between 850° C. and 1050° C.

E14. The method according to any of the embodiments E1-E10, wherein the waste minerals (12, 32) comprises cementitious material, the recyclable product to be obtained is a reactivated cementitious material, and the method comprises carbonatation of reactive oxygen groups in the reactivated waste minerals by supplying carbon dioxide to obtain an elevated carbon dioxide level during carbonatation.

E15. A system for obtaining a recyclable product (4) from waste minerals (12, 32) by heating a combustor (10, 30) by combusting waste fuel (13, 33) in the combustor, the system comprises:
- a feeder (11, 11') arranged to supply waste minerals (12, 32) and waste fuel (13, 33) to the combustor,
- an oxygen supply (18) arranged to supply oxygen (15) to the combustor (10, 30) to obtain a preselected oxygen level,
- an gas outlet arrangement (20) to remove flue gas comprising carbon dioxide from the combustor (10, 30) for recycling,
- a gas inlet arrangement (19) to supply recycled flue gas comprising carbon dioxide to the combustor (10, 30),
- a controller (40) arranged to control the combustion temperature in the combustor (10, 30) to obtain the preselected process temperature by combusting waste fuel (13, 33), and by controlling the amount of waste fuel (13, 33) and flue gas supplied to the combustor (10, 30) to obtain the preselected process temperature,
- an removal arrangement (38) arranged to remove residual material (6, 6') from the combustor (10, 30), the residual material is the material remaining after combusting the waste minerals (12, 32) and the waste fuel (13, 33), and
- means arranged to recover the recyclable product (4) from the residual material (6, 6').

REFERENCE NUMBERS FOR THE FIGURES

4 Recycled product
5 Flue gas (Hot flue gas)
6, 6' Residual material
9 Grinders
10 Combustor
11 Feeder
12 Waste minerals
13 Waste fuel
14 Buffer
15 Oxygen
16 Flue gas (recycled flue gas) (cooled flue gas)
17, 17' Cooler
18 Oxygen supply
19 Gas inlet arrangement
20 Gas outlet arrangement
21, 21' Conveyer
22, 22' Magnetic separator arrangement
23 Metal container
24, 24' Ball mill
25, 25' Silo
30 Subsequent combustor
31 Feeder
32 Waste minerals
33 Waste fuel
34 Buffer
38 Removal arrangement
40 Controller
65 Channel
66 Excess flue gas
67 Cooled residual material
68 Stream boiler
69 Return channel
70 Gas treatment channel
71 Filter
72 Heat exchanger
73 First scrubber
74 NaCl tank
75 Second scrubber
76 NaOH tank
77 Tank
78 Condenser
79 Chimney
80 Condensate cleaning process
81 Solid waste container
82 Water storage
83 Carbon dioxide treatment
84 Carbon dioxide storage
85 Pump
86 Pump
91 Heating process
92 Material cooling process
93 Cleaning process
94 Flue gas cooling process
95 Flue gas treatment process
96 Metals
97 Other materials
101 Gasses
102 Water vapour
103 Carbon dioxide
104 Airborne particles
301 Material supply step
302 Oxygen supply step
303 Flue gas removal step
304 Flue gas return step
305 Control step
306 Remove residual step
307 Recovery step

The invention claimed is:

1. A method for obtaining a recyclable product from waste minerals by heating a combustor by combusting waste fuel in the combustor; the method is comprising the steps:
   supplying waste minerals and waste fuel to the combustor, the waste mineral comprise mineral wool or cementitious material, which is recovered; the waste fuel comprise wood or any kind of waste material, which is at least partly burned;
   supplying oxygen to the combustor to obtain a preselected oxygen level,
   removing flue gas comprising carbon dioxide from the combustor for recycling,
   supplying recycled flue gas comprising carbon dioxide to the combustor,
   controlling the combustion temperature in the combustor to obtain the preselected process temperature by combusting waste fuel, and by controlling the amount of waste fuel and the recycled flue gas supplied to the combustor to obtain the preselected process temperature,
   removing residual material from the combustor, the residual material is the material remaining after combusting the waste minerals and the waste fuel, and
   recovering the recyclable product from the residual material.

2. The method according to claim 1, wherein the method further comprises placing the removed residual material in a cooler.

3. The method according to claim 2, wherein the method further comprises supplying flue gas containing carbon dioxide to the cooler.

4. The method according to claim 1, wherein the method further comprises the step:
cooling the residual material to obtain a temperature, at which the waste minerals absorbs carbon dioxide by carbonatation.

5. The method according to claim 1, wherein the method further comprising the steps:
cleaning the flue gas removed from the combustor by removing, at least partly, excess gases and dust particles from the flue gas.

6. The method according to claim 1, wherein the method further comprising the steps:
cooling the flue gas removed from the combustor to a preselected cooling temperature.

7. The method according to claim 2, wherein the method further comprises the step:
cooling the residual material with the cooled flue gas comprising carbon dioxide.

8. The method according to claim 2, wherein the method further comprises the steps: supplying oxygen to the cooler for forming $NO_2$ from nitrogen compounds like $N_2$, NO, $N_2O$ in the flue gas, and removing the $NO_2$ from the flue gas by scrubbing with water comprising dissolved NaOH or KOH.

9. The method according to claim 1, wherein supplying waste minerals and waste fuel to the combustor comprises one or more feeders, the feeders are continuously supplying waste minerals and waste fuel to the combustor.

10. The method according to claim 1, wherein recycling flue gas comprises receiving flue gas from a subsequent combustor and/or supplying flue gas to a subsequent combustor.

11. The method according to claim 1, wherein the waste minerals comprises mineral wool, the recyclable product to be obtained is a silicate, and the method comprises oxidising the waste minerals by supplying oxygen to the combustor to obtain a preselected oxygen level.

12. The method according to claim 11, wherein the preselected oxygen level is higher than 15%.

13. The method according to claim 11, wherein the preselected process temperature is between 400° C. and 1500° C.

14. The method according to claim 11, wherein the preselected process temperature is between 650° C. and 1200° C.

15. The method according to claim 11, wherein the recyclable product comprises pozzolanic silicates.

16. The method according to claim 1, wherein the waste minerals comprises cementitious material, the recyclable product to be obtained is a reactivated cementitious material, and the method comprises carbonatation of reactive oxygen groups in the reactivated waste minerals by supplying carbon dioxide to obtain an elevated carbon dioxide level during carbonatation.

17. A system for obtaining a recyclable product from waste minerals by heating a combustor by combusting waste fuel in the combustor, wherein the waste mineral comprise mineral wool or cementitious material, which is recovered; the waste fuel comprise wood or any kind of waste material, which is at least partly burned; the system comprises:
a feeder arranged to supply waste minerals and the waste fuel to the combustor,
an oxygen supply arranged to supply oxygen to the combustor to obtain a preselected oxygen level, an gas outlet arrangement to remove flue gas comprising carbon dioxide from the combustor for recycling,
a gas inlet arrangement to supply recycled flue gas comprising carbon dioxide to the combustor,
a controller arranged to control the combustion temperature in the combustor to obtain the preselected process temperature by combusting the waste fuel, and by controlling the amount of the waste fuel and the recycled flue gas supplied to the combustor to obtain the preselected process temperature, a removal arrangement arranged to remove residual material from the combustor, the residual material is the material remaining after combusting the waste minerals and the waste fuel,
means arranged to recover the recyclable product from the residual material and a cooler to place the removed residual material and the cooler supplied with flue gas containing carbon dioxide, cooler comprises a conveyer, moving the residual material from the combustor and to the cooler, through the cooler and out of the cooler as cooled residual material, channeling the excess flue gas from the cooler to either the combustor or a steam boiler, and a gas treatment system including a pump to receive the cooled gas and return the cooled gas to the combustor or the steam boiler.

* * * * *